US006392181B1

(12) United States Patent
Cleaveland et al.

(10) Patent No.: US 6,392,181 B1
(45) Date of Patent: May 21, 2002

(54) ARC EXTINGUISHING DEVICE WITH A HIGH SPEED WHIP

(75) Inventors: Charles M. Cleaveland; Arthur E. Bisig, both of North Huntingdon, PA (US)

(73) Assignee: Cleaveland/Price Inc., Trafford, PA (US)

( * ) Notice: Subject to any disclaimer, the term of this patent is extended or adjusted under 35 U.S.C. 154(b) by 0 days.

(21) Appl. No.: 09/704,650

(22) Filed: Nov. 2, 2000

(51) Int. Cl.[7] .................................................. H01M 9/38
(52) U.S. Cl. ............................................ 218/18; 218/14
(58) Field of Search ............................ 218/2–8, 12, 14, 218/18, 78, 84, 43, 67, 71, 154

(56) References Cited

U.S. PATENT DOCUMENTS 3,217,115 A 11/1965 Kaplan
4,170,014 A 10/1979 Sully
4,243,854 A 1/1981 Pahl
4,860,481 A * 8/1989 Christenson ................ 43/18.1
4,945,333 A * 7/1990 Stroud et al. ............... 337/176
5,186,315 A 2/1993 Koppe et al.
5,359,167 A 10/1994 Demissy et al.
5,369,234 A * 11/1994 Demissy ........................ 218/7

OTHER PUBLICATIONS

Josyln, D.B. 730–201, Mar. 1989, "Hi–Velocity Interrupters".
Cleaveland/Price Inc., Bulletin DB–106BH97, 1997, (No month).
BBC Brown Boveri, Inc., Bulletin 2.3.1–1C, 12/84, "I–T–E Outdoor Air Switches", p. 9. (No date).
Composites Technology, Yellow Pages 2000, pp. 6–20, "FRP Materials . . ." (No date).

* cited by examiner

*Primary Examiner*—Lincoln Donovan
(74) *Attorney, Agent, or Firm*—Gordon Telfer

(57) ABSTRACT

Rapid arc extinguishing devices for air switches are provided with a whip element of strong nonmetallic material, such as of a fiber reinforced plastic or polymer material, with a conductive path, e.g., by metalizing. The whip element can replace the formerly used metal whip in quick break devices for faster separation with less chance of arc restriking and facilitates achieving higher current and voltage ratings.

20 Claims, 4 Drawing Sheets

ARC EXTINGUISHING DEVICE WITH A HIGH SPEED WHIP

BACKGROUND OF THE INVENTION

1. Technical Field

This invention relates generally to electrical switchgear, such as air break (or disconnect) switches used in transmission lines, and, more particularly to quick break whips for rapid arc extinguishers in such switches.

2. Background Art

Air break switches, sometimes called disconnect switches, are used in electrical transmission, or distribution systems to assist in isolating sections of line or faults. Under some conditions opening a line can be performed, reliably and without appreciable arcing of consequence, by normal opening of the switch main contacts. Under some other conditions, it is important to minimize and rapidly extinguish the arc that occurs on opening the main contacts.

A situation that raises a need for rapid arc extinction is upon a switch opening a line, typically extending for miles, where the line is connected at one end to a live source, i.e., a generator of AC power, but no load is connected to the other end of the line. The line becomes highly charged and its opening normally causes a high voltage arc. Typical system voltages are in a range of from about 69 KV. To about 230 KV. Under the described conditions, the current is of a magnitude that depends on the length of the line being disconnected from the source and is typically in a range of from about 6 to about 20 amperes; a larger current results from a greater length of disconnected line due to the capacitance between the line and ground.

The industry has recognized the desirability of rapid opening of the switch to minimize the size of the arc and to minimize restriking of the arc. Restriking of the arc occurs when the sinusoidal voltage typically at 60 Hz, rises after the current has interrupted and the contacts are still close enough for an arc that was extinguished at the zero current crossing to strike again as the voltage rises.

Ideally, the gap between switch contacts should become large enough sufficiently fast that no restrike can occur. There is, in a 60 Hz system, only about 8.3 milliseconds (ms.) between zero current crossings, or between peaks, which is a half-cycle of the AC sine wave. It is therefore preferred to get a safe separation of the contacts in less than about 8 ms. Restriking of an arc not only prolongs the time needed for switch opening, it can sometimes make it even harder to finally extinguish the arc on successive zero crossings because a restrike can cause the current and voltage to increase.

Prior known equipment has sought to have rapid contact separation to achieve arc extinction. Some air break or disconnect switches with the otherwise usual main contact and switch opening features have been provided with an arc extinction device sometimes referred to as a quick break whip or a high velocity arc interrupter. These devices are characterized by having a flexible resilient rod (or “whip”) of a metal, such as beryllium-copper alloy, stainless steel or aluminum, that is conductively joined with one of the main switch contacts, and a latch or hook, of a more rigid conductor, that is conductively joined with a second main switch contact.

In operation, when the switch is initially opened, the whip slides against the latch and maintains a temporary by-pass of the main switch contacts. During that initial opening, the whip is flexed into an arcuate configuration by the latch, thus storing spring energy. After further opening, the whip is freed from the latch and its stored energy is released. The whip end then moves with high velocity away from the latch, due to the spring properties of the whip, to interrupt the circuit.

To further contribute to the speed of the whip or rod, some designs have had an arrangement with an additional spring (sometimes referred to as an accelerator spring) for storing additional contact opening energy. Some designs also have shock absorbing elements intended to keep the released whip from springing back to a location near the latch where the arc can again ignite.

The prior art equipment is commonly used but is not consistently able to avoid arc restriking and is limited in how long a line it can interrupt at a given voltage.

Other known apparatus for switching at high current and voltage includes vacuum interrupters. They can be made to perform reliable switch opening but incur a considerable disadvantage in cost compared to air switches with a quick break whip.

The present invention is directed to overcoming one or more of the problems or disadvantages associated with the prior art.

BRIEF SUMMARY OF THE INVENTION

The invention is directed to such apparatus as generally described above but with a whip element of a strong and flexible nonmetallic material, such as a fiber reinforced plastic or polymer material on, or in, which there is a conductive path. Such a whip element is found to enable opening at a sufficiently fast rate to minimize any chance of arc restriking and to allow higher current, and longer lines, to be interrupted at higher voltages.

The invention is directed to such whip elements as well as to quick break arc extinguishing devices that include such a whip element and air switches that include such an arc extinguishing device.

The whip of the invention can be conveniently made from readily available fiber reinforced plastic members like, or similar to, those formerly used in fishing rods and golf club shafts. Known techniques for filament winding and resin application and curing are satisfactory for making the basic member of the whip. The required conductive path of the whip can be provided, for example, by metalizing the surface of the plastic member. It is also suitable to have sufficient conductivity within the plastic member, either by conductive, e.g., carbon, filaments or some other conductive additive. In addition, a combination of conductive filaments and a metalized surface is a further example.

By way of further example, a whip is made of a commercially available fiber reinforced plastic rod, for example of epoxy resin, on which a conductor, e.g. silver, has been plated. In addition, a conductive paint can be applied to the plastic rod to serve as the conduction path or the rod may be first painted with a conductive paint and then coated with a metal such as by plating or vacuum deposition.

The improved whip element can be used in a quick break device of otherwise known structure by replacement of the formerly present all metal rod. Improved performance is represented, for example, by one set of experiments showing whip speed under comparable conditions. An air switch with a quick break whip device having a conventional metal whip produced open gap dimensions of only about 6 to 8 inches in 8 ms. With a whip in accordance with the invention, of substantially the same size, in the same device, an open gap of between about 14 to 26 inches was attained in the same time, 8 ms. Further tests with voltage applied have shown that the increase in speed of the improved whip substantially reduces arc restrikes and can normally avoid any restriking thus reducing the size of the arc. That makes it less likely for a phase to phase fault or a phase to ground fault to occur.

The improved whip of such an example was of a carbon filament reinforced epoxy resin in a tapered, tubular configuration, substantially like a fishing rod. It has about four times the strength to weight ratio (referred to as the "specific strength") of beryllium copper alloy, which is the strongest material commonly used in the prior art for such whips. The new whip also stands out in flexibility, i.e., the ability to bend a large amount without breaking or permanent deformation, and resilience, i.e., the ability to return to its original configuration. The very low weight of the fiber reinforced plastic, even with a metalized surface, (for example about 1.5 oz., compared to about 10 oz. for a metal whip) contributes to the high specific strength of the improved whip. Furthermore, the plastic member can be tapered and tubular for lowest weight and highest strength as is readily available from commercial sources because similar articles, with no metalizing, have been manufactured for totally unrelated purposes.

The inventive whip element can be used along with, but does not require, the prior art structures that have extra accelerator springs for additional energy storage, but which incur some extra cost and complexity. It is advantageous that the whip itself can, at least in many, if not all cases, provide all the spring energy necessary; also, shock absorbers to prevent a rebound arc are not considered necessary.

The benefits of the invention are believed attainable with no significant cost increase and obviate the need for a vacuum interrupting device in many applications.

While it is convenient to modify prior whip devices by introducing the whip element of the invention, it also can be practical and advantageous to use a whip as described in a device of a modified design which will achieve more separation of the whip tip in 8 m.s. because of the higher specific strength of the nonmetallic materials used in the whip. A further advantage is the lower force needed to bend the whip into its energy storing position thereby making it easier to operate the switch manually.

Other aspects and features of the present invention will be obtained from the entirety of the description, drawings and claims.

DETAILED DESCRIPTION OF THE INVENTION

Figure 1:
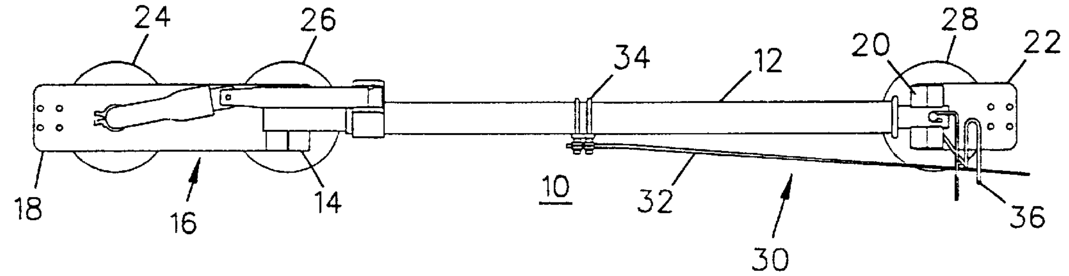
FIG. 1 is a top plan view of apparatus, called a vertical break switch, improved by the invention.
Figure 2:
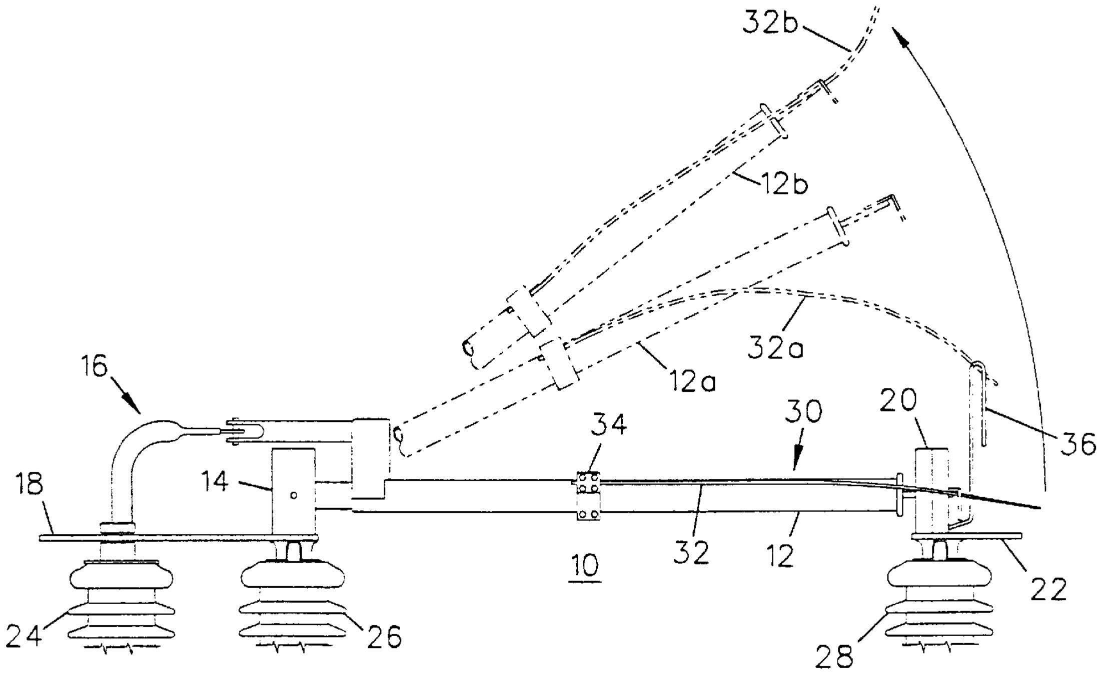
FIG. 2 is a front elevation view party broken away, of the apparatus of FIG. 1 with a phantom showing of the motion of certain parts.

Referring to FIGS. 1 and 2, an air switch 10 is illustrated. The switch 10 includes a movable conductive blade or arm 12 assembled at the left end with a hinge 14 and elements of a switch opening mechanism 16. The hinge 14 includes a conductive contact that maintains conductive engagement with the end of the blade 12. The contacts of hinge 14 also maintain a conductive path to a terminal pad 18.

The blade or arm 12 is shown in FIG. 1 and in the solid line view of FIG. 2 with its right end engaged, or in a closed switch position, with contacts of a jaw 20 that is joined in a conductive path to another terminal pad 22. Insulators 24 and 26 support the left terminal pad 18 and hinge 14 and insulator 28 supports the jaw 20 and terminal pad 22. Switch 10 can be installed, for example, in a transmission line (not shown) with line segments connected to the respective terminal pads 18 and 22.

The switch opening mechanism 16, not detailed here, is one that is, for example, manually operated by use of a swing handle or wormgear mechanism or electrically operated by use of a motor operator. Mechanism 16 also serves to reclose a switch 10 after it has been opened.

In FIG. 2 it can be seen that when the arm 12 is pivoted on the hinge 14, the right end of the arm 12 separates from the jaw 20 and the arm rises from its original horizontal orientation to successive arm positions including the position indicat with the arm referenced by 12*a* and the position with the arm referenced by 12*b*. Upon completion of the operation of the mechanism 16, the arm 12 is in a substantially vertical orientation (not shown).

Because the apparatus of FIG. 2 has the arm 12 moving in a vertical plane it is referred to as a vertical break switch. It may, however, be mounted for arm motion in other orientations.

The apparatus of FIGS. 1 and 2, as described so far, is substantially in accordance with the prior art, such as described in Cleaveland/Price Inc. Bulletin DB-106BH97, published 1997, which is herein incorporated by reference for additional description of such switches and their operation and applications.

In addition to the previously mentioned elements, FIGS. 1 and 2 also show, as part of the switch 10, a rapid arc extinguishing device 30, sometimes referred to as a "quick break whip" although the arc extinguishing device 30 includes elements in addition to a whip 32. In this example, the device 30 includes a clamp 34 fastening the left end of the whip 32 to the arm 12. The device 30 also includes a latch or hook 36 conductively joined with the right terminal pad 22. The elements (such as 34 and 36) of the arc extinguishing device 30 can be like those previously used in arc extinguishing devices for vertical break switches, except for the whip 32 itself.

In arc extinguishing devices that use some kind of whip, and are applied to an air switch, when the switch is initially opened, the whip is flexed into an arcuate configuration by the motion of the contact arm, to which one end of the whip is joined, and the fixed location of the latch, which catches the other end of the whip. The view of the whip referenced as 32*a* in FIG. 2 indicates such an arcuate configuration during which spring energy is stored. After the contact arm 12 moves to a position beyond that shown at 12*a*, the free end of the whip 32 separates from the latch the stored energy causes a whip like motion for the whip 32 that separates it a larger distance from the latch. The position shown with the arm referenced as 12*b* and the whip referenced as 32*b* is illustrative of the whip like motion away from the latch 36 that the whip 32 makes to increase the distance between the arc carrying parts.

In accordance with the present invention, in contrast to prior rapid arc extinguishing devices, the whip 32 of the device 30 is one that principally includes a nonmetal material that also has sufficient conductivity for initially capturing any arc occurring when the whip 32 and the latch 36 separate. It has been found that rapid arc extinction is enhanced by high velocity motion of the end of the whip and that a nonmetal, such as a polymer, or plastic, material having fiber reinforcement, provides a high strength and high flexibility whip that results in faster motion upon release of the whip 32 from the latch 36.

Further description of examples of the whip 32 will be found in the following discussion but first reference is made to FIGS. 3 and 4 for a different sort of air switch 110 incorporating the invention.

The air switch 110 is one referred to as a center break switch. It has a pair of insulative supports 126 and 128. Support 126 has a conductive contact arm 112 and a line terminal 118 secured at one end to the support. A contact 115 is secured to the other end of the arm 112. The right support 128 has a conductive contact arm 113 and a line terminal 122 secured to it. The other end of the arm 113 has a contact 120 secured to it. In most instances, the elements of FIG. 3 have reference numerals whose last two digits are the same as reference numerals for corresponding elements of FIGS. 1 and 2.

Corona shields (not shown) may be arranged on opposite sides of the contact 115 and opposing sides of contact 120. The switch 110 operates by a mechanism (not shown) at the lower end of the supports 126 and 128 between a closed position and an open position by equal angular movement of the two supports 126 and 128. The basic elements of a center break switch, such as switch 110 and the parts described so far, can be consistent with prior art designs which are well known and will not be described further here.

Figure 3:
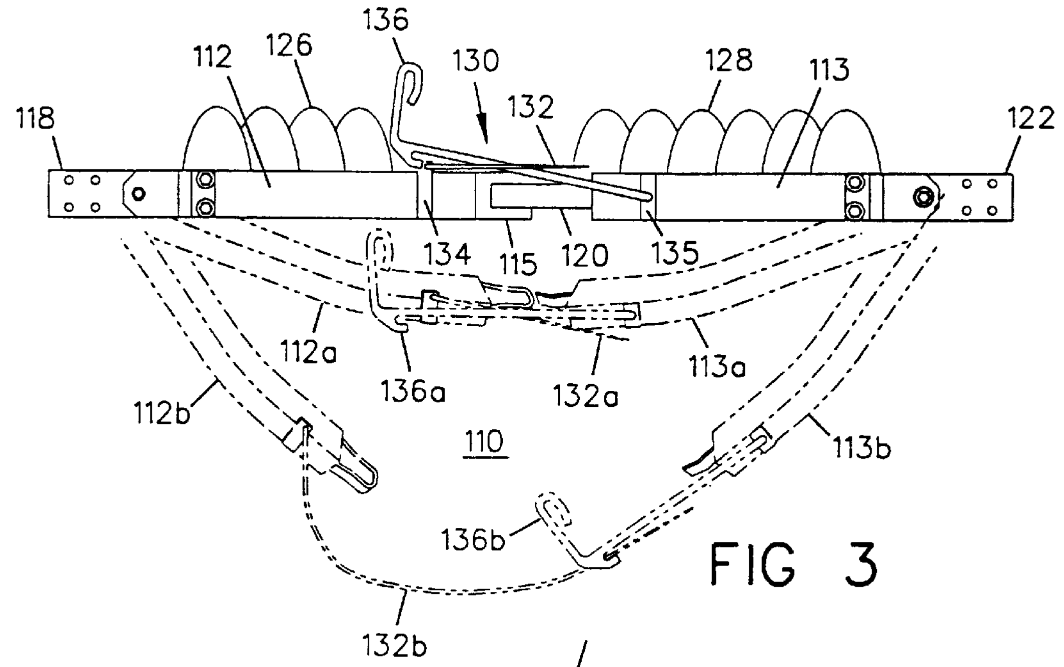
FIG. 3 is a top plan view of another apparatus, called a center break switch, improved by the invention with a phantom showing of the motion of certain parts.
Figure 4:
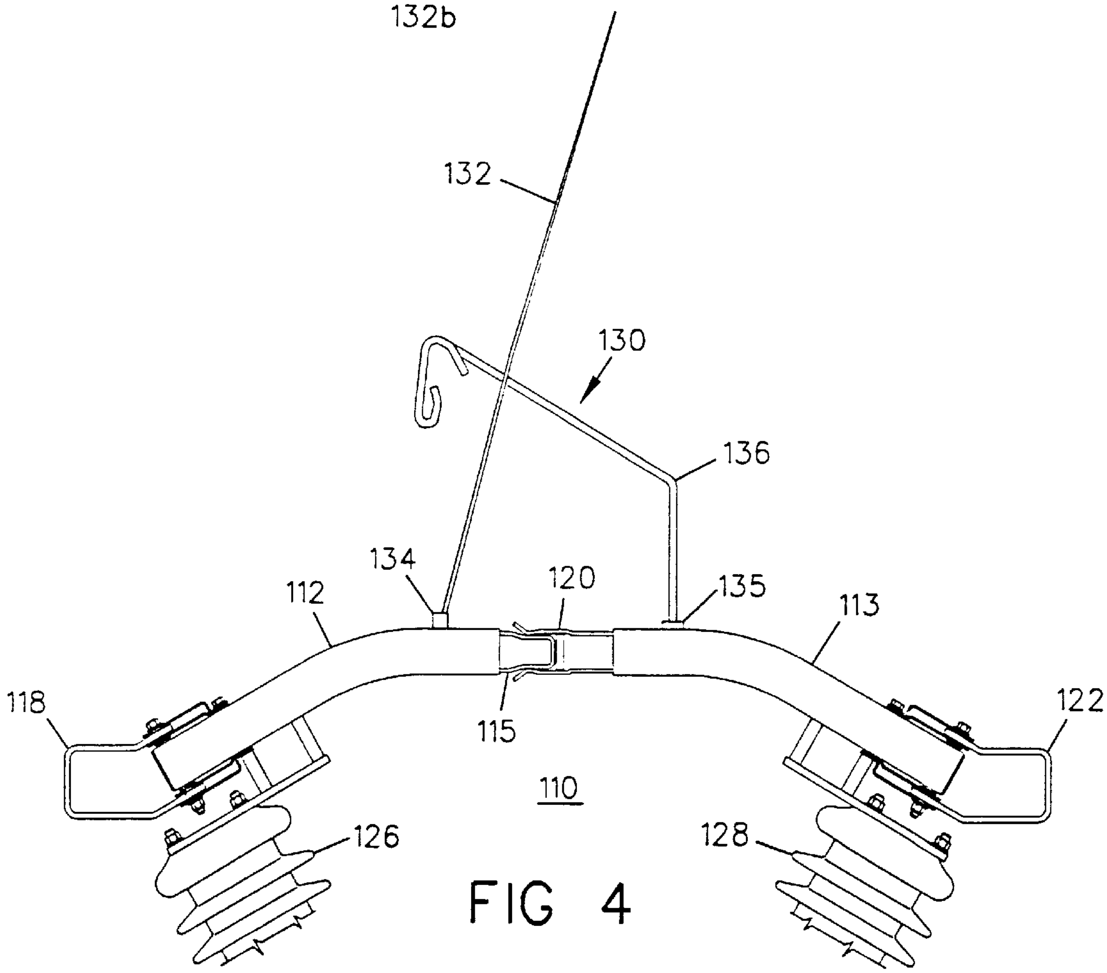
FIG. 4 is an elevation view of the apparatus of FIG. 3.

FIGS. 3 and 4 also show a rapid arc extinguishing device or "quick break whip", 130. The device 130 includes a whip element 132 secured at one end by a clamp 134 to the contact arm 112. The device 130 also includes a hook or latch 136 that is supported at one end by a clamp 135 to the contact arm 113.

In the closed position of the switch 110 shown in FIG. 3 the contact 115 on the arm 112 is confined in contact 120. As the switch 110 opens successive positions with the arms at positions with reference numbers 112*a* and 113*a* and, later, at 112*b* and 113*b* are reached. With the arms at 112*a* and 113*a*, the main contacts 115 and 120 have just separated and the electrical conduction transfer to the whip 132*a* and latch 136*a* has just begun. When the contact arms are in the positions referenced as 112*b* and 113*b*, the whip element 132*b* is flexed into a curvature with its free end engaging the latch 136*b*. Upon subsequent motion (not shown), the whip springs out from the latch and moves away from the latch similar to the effect described in connection with FIG. 2. (The motion illustrated in FIG. 3 reflects the fact that the motion of the arms 112 and 113 is not all in one vertical plane.) While other elements of the arc extinguishing device 130 may be substantially as used in prior arc extinguishing devices, the whip element 132 is not. The whip element 132 is as described previously for the whip 32 of FIGS. 1 and 2 and further described below. It principally comprises a member of a nonmetallic material of high strength that achieves higher acceleration when released than prior metal whips but which also has a light weight conductive pathway that achieves the necessary conduction for carrying the current on separation of the main contacts 115 and 120.

Figure 5:
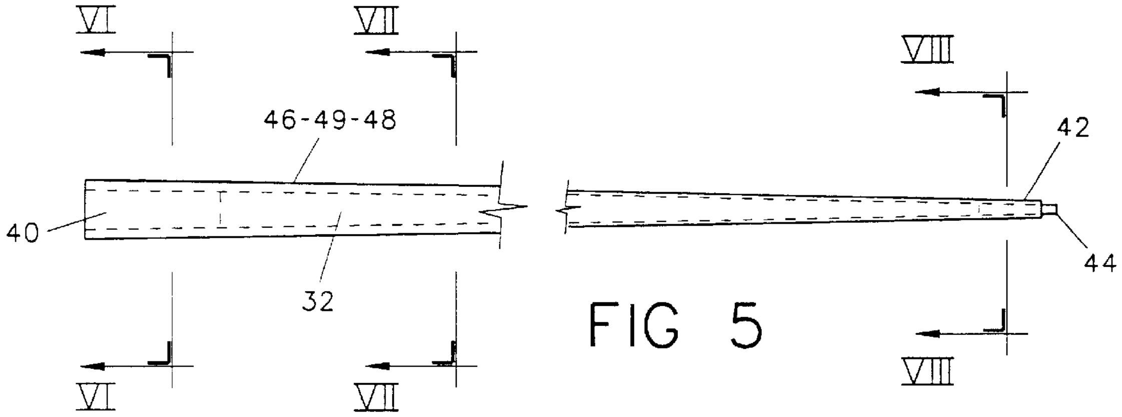
FIG. 5 is an elevation view of an example of a whip in accordance with the invention for use in apparatus such as those of FIGS. 1–4.

FIGS. 5 through 8 illustrate an example of a whip 32 for use in switch 10 of FIG. 1 and 2, and which also may be used as the whip element 132 of FIGS. 3 and 4. FIG. 5 shows an overall exterior view of whip 32 with its tapered configuration from a wider, blunt, end 40 to a pointed or tip, end 42. The blunt end 40 is the end secured to a switch arm, such as arm 12 in FIG. 1. The end 40 may include a greater mass for a few inches of length for sturdier support when clamped to a contact arm, as further described in connection with FIG. 6. The tip end 42 may have a small conductor 44 extending from it, as further described in connection with FIG. 8. The drawings are not to scale. Dimensions can be selected from a wide range. Typical outer dimensions include those in which the length of the whip 32 is between about three feet and about seven feet, the outside diameter at the stub end 40 is typically between about 0.2 inch and about 0.6 inch, and the outside diameter at the tip end 42 is typically between about 0.1 inch and about 0.2 inch.

Figure 7:
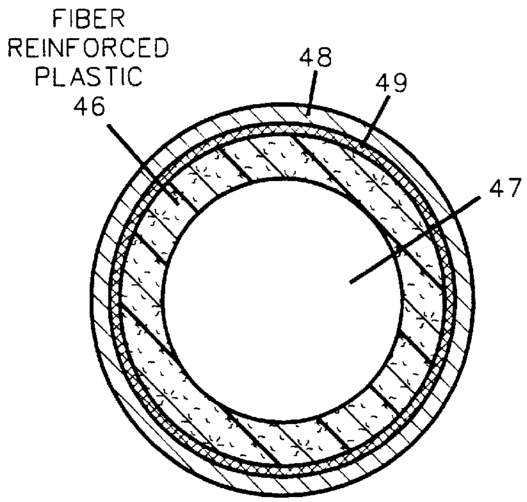
FIG. 7 is an enlarged cross-sectional view taken along the line VII—VII of FIG. 5.

FIG. 7 shows a cross-section of the whip 32 along line VII—VII between the ends 40 and 42. The innermost part of the whip 32 is a nonmetal member 46 of a polymer, a composite, or a plastic material that is tubular with an open center 47. Merely by way of example, the wall thickness of member 46 may typically be between about 0.03 inch to about 0.1 inch. The wall thickness may be consistent over the length of member 46 and whip 32 or it, too, may taper from a greater thickness at the blunt end 40 to the tip end 42.

The form of member 46 and its composition can be conveniently selected from among commercially available members, such as for fishing rods, where a high degree of strength and flexibility are desired. Such members include those of fiber reinforced plastics, such as with glass or carbon fibers in epoxy or polyester resins where the fibers may be either present as particles or are filament wound. Suitable materials include, without limitation, those sold by various commercial suppliers such as Lamiglas, Shakespeare, and Skypole.

Fiber reinforced plastics suitable for use as the member 46 of the whip 32 may be made in accordance with known practices such as open contact molding and tube rolling, including tapered tube rolling, as generally described, for example, in "FRP Materials, Manufacturing Methods and Markets" in Composites Technology, Yellow Pages 2000, pages 6–20, published by Ray Publishing Inc., Wheat Ridge, Colo., which is herein incorporated by reference for its general description of materials and processes used in making fiber reinforced plastic articles.

In its broader aspects, a whip 32 need not necessarily be tapered or tubular and need not necessarily be circular. The illustrated embodiments are examples of whips that are conveniently available and are effective.

A whip composite member 46 may have conductive elements (e.g., carbon filaments or metal particles) within its polymeric or plastic mass but the principal examples to be described do not rely on constituents of the member for their total electrical conduction.

In the illustrated examples, a layer of metallization 48 is on the exterior of the composite member 46. Typically the metallization 48 is applied by electroplating of a good conductor, such as silver or copper, although other techniques may be employed, including vapor deposition and dipping into, or otherwise applying, a conductive paint. In the particular example illustrated the composite member 46 first has a layer 49 of a conductive paint applied to its surface on which a thicker metallization 48 is applied. It has been found effective, for example, to plate silver, such as in a thickness of from about 0.002 in. to about 0.006 in. onto a member 46 that has a thin conductive paint layer 49. Good adherence and good conduction are achieved. Even with such layers as 48 and 49 on it, the member 46 is found to retain its high strength and acceleration because the added mass of the thin layers is relatively low.

Figure 6:
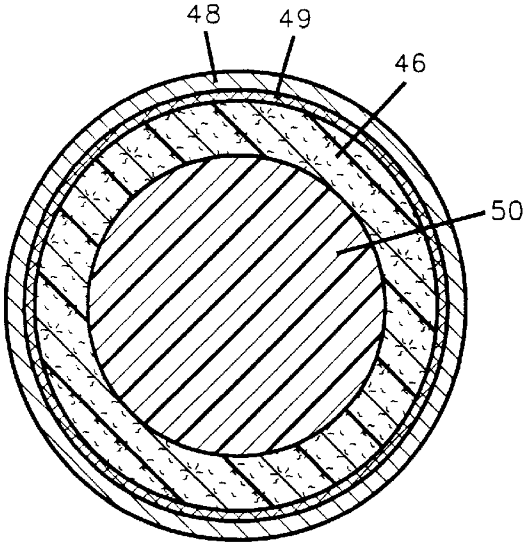
FIG. 6 is an enlarged cross-sectional view taken along the line VI—VI of FIG. 5.

FIG. 6 shows a section of the blunt end 40 along line VI—VI. Here the center 47 of the composite member 46 is filled, such as with a plastic material 50, e.g. epoxy resin. The center material 50, in this example, is substantially limited to just the whip portion clamped to a contact arm and helps achieve secure fastening without collapsing the tubular member 46. Other examples need not have resin filled centers if the tube has sufficient strength. Also, added strength can be provided by inserting a short section of another, smaller, tube of material like that of the tube 46 into the blunt end for the portion engaged by the clamp 34.

Figure 8:
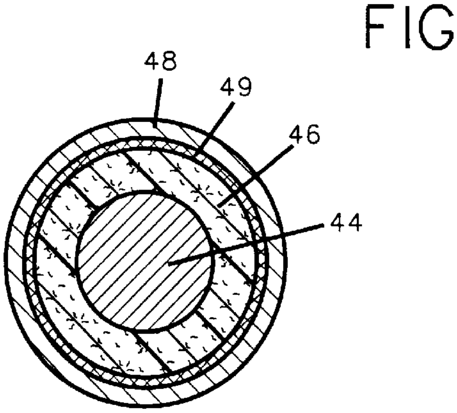
FIG. 8 is an enlarged cross sectional view taken along the line VIII—VIII of FIG. 5.

FIG. 8 shows a section of the tip end 42 of the whip 32 taken along line VIII—VIII. Here, the tip conductor 44 is shown confined by the tubular member 46 but it may also be secured by a bonding material (not shown), such as epoxy resin. The tip conductor 44 may be conductively joined to the metal layer 48 during the metalizing process and extends a short distance beyond the tip end 42 of the member 46. Conductor 44 serves as an arcing point, like a lightning rod, to catch an arc between the whip 32 and the latch 36, when they initially separate, so as to minimize any melting damage as might occur from the heat of the arc. Other examples may not have a tip conductor 44 if the thickness of the metal 48 is sufficient to resist arc burning. The tip 42 may have some other form of extra conductor at its end instead of the tip conductor 44.

In some versions, a composite member 46 may have a highly flexible conductive strand extending within its whole length to provide some or all of the necessary conduction. In general, the composite member 46 has a conductive path on it or within it, or both, including the case in which a conductive path is within the tubular member 46, as by a continuous strand of wire, and the case in which a wire is embedded in the material of the composite member 46 itself. By such embodiments, adequate conduction is provided but the desired spring like characteristics are achieved by the composite member rather than merely a metal conductor as in prior apparatus.

Figure 9:
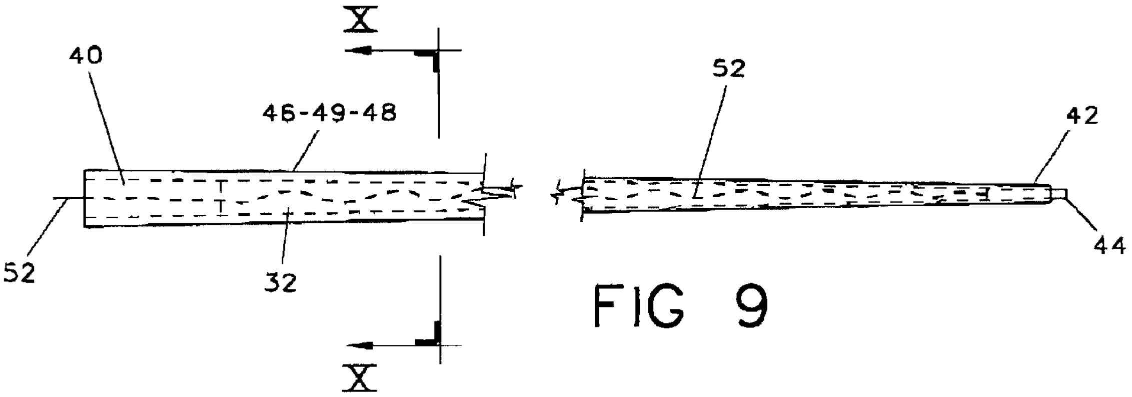
FIG. 9 is an elevation view of a further example of a whip in accordance with the invention; and, FIG. 10 is an enlarged cross-sectional view taken along the line X—X of FIG. 9.
Figure 10:
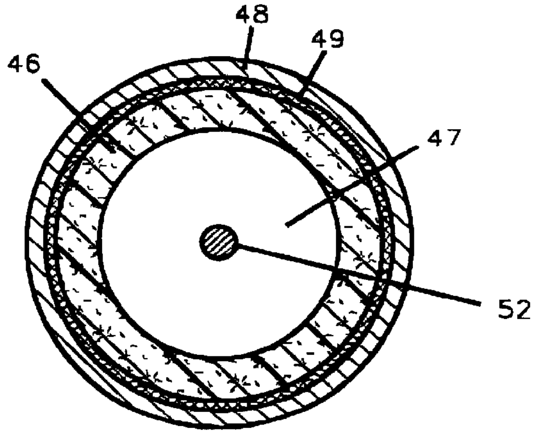

For illustration of one such alternative embodiment, FIGS. 9 and 10 show a composite member 46, with metallization 48 and conductive paint 49 as in FIGS. 5–8, having a flexible conductive strand, or wire, 52 extending within it.

It has been demonstrated that a whip 32 as shown and described can achieve a substantially greater acceleration and velocity on separation from a hook 36 than does a metal whip. The greater velocity of separation achieves the ability to avoid arc restrikes. Tests at 70 KV. on a center break switch as in FIG. 3 have shown that a metal whip will have frequent arc restrikes but a whip 32, with higher separation velocity, can avoid restriking altogether. The improvement of the invention is one that, at least, substantially minimizes arc restriking compared to metal whips under the same conditions. Furthermore, such improvement shows that the extra springs and shock absorbers of the prior art, which have not been highly effective, are not necessary to achieve a quick break whip operating with minimal arc restriking. Furthermore, the invention facilitates interruption of longer lines and lines energized to higher voltages than has been achieved with metal whips.

Switch designs do not have to be changed. A rapid arc extinguishing device, or quick break whip device, with the improved whip may be applied as an accessory to existing air break switches. The switch design and the rapid arc extinguishing device design may, also, be varied in other ways from those formerly used. For example, a configuration can be made so even greater flexing of the whip occurs so even greater spring energy is stored and then released for higher velocity.

Longer life of the whip 32 is aided if the configuration of a hook or latch 36 or 136 is such as to insure continuous contact with the whip throughout operation until final separation. If the configuration is one that allows the whip 32 to skip, or briefly separate, from the hook and then recontact, there can be arcing during the interval of the brief separation that is desirably avoided to minimize arc damage.

A further optional feature is for the surface of the whip 32 and the latch 36, either one or both, to be made with engaging surfaces that have a lower coefficient of friction to aid in high velocity separation. Polishing or buffing the mating surfaces, with sufficient conduction, are among the various techniques, although a smooth metalized metal surface 48 and a hook or latch 36 of metal such as has been used in prior apparatus are suitable without extra treatment. The hook or latch 36 can still be of an economical metal such as one of galvanized or stainless steel. Alternative conductors may also be used.

Other modifications and variations are believed apparent to those skilled in the art from the foregoing description of examples and are intended to be embraced by the appended claims.

What is claimed is:

1. A rapid arc extinguishing devices for use in combination with an air break switch, comprising:

a whip element and a latch element each having a respective attachment device for securement to a conductive contact element of a switch;

the whip element comprising a nonmetal composite member, of a flexible fiber reinforced plastic polymer material, and a conductive pathway supported by the nonmetal composite member from one end secured by its attachment device to a second end that is last to disengage from the latch element during operation of the device.

2. The device of claim 1 where:

the nonmetal composite member of the whip element comprises a hollow tubular, tapered, member with a blunt end and a tip end, and its blunt end is secured by the attachment device, and the conductive pathway supported by the composite member comprises a layer of metallization on the surface of the composite member.

3. The device of claim 1 where:

the blunt end of the composite member that is secured by the attachment device is reinforced with an additional material.

4. The device of claim 1 where:

the tip end of the composite member has a metal conductor member which is electrically connected to form part of the conductive pathway.

5. The device of claim 2 where:

the layer of metallization comprises a layer of plated silver.

6. The device of claim 5 where:

the layer of plated silver is disposed over a layer of conductive paint that is on the surface of the composite member.

7. An air break switch comprising:

a pair of main switch contacts each with a line terminal for connection with segments of an electrical line;

a switch opening mechanism for opening the main switch contacts;

a rapid arc extinguishing device, for extinguishing arcs occurring on opening of the main switch contacts, including a whip element attached in electrical contact with one of the main switch contacts and a latch element attached in electrical contact with the other of the main switch contacts;

the whip element comprises a flexible fiber reinforced plastic polymer member with a flexible conductive path extending from end to end of the polymer member;

the latch element comprising a substantially rigid conductive metal member.

8. The switch of claim 7 where:

the conductive path of the whip element comprises a layer of metal on the surface of the polymer member.

9. The switch of claim 7 where:

the conductive path of the whip element comprises a conductor extending within the polymer member.

10. The switch of claim 7 where: the reinforced plastic polymer member comprises carbon fiber reinforced epoxy resin.

11. The device of claim 2 where:

the tip end of the composite member has a metal conductor member which is electrically connected to form part of the conductive pathway, and a strand of wire extends within the composite member.

12. The switch of claim 8 where:

the polymer member also has a strand of wire extending within it.

13. The device of claim 1 where:

the conductive pathway supported by the nonmetal composite member includes a conductor on the exterior of the composite member arranged to make sliding conductive engagement with the latch element during switch opening.

14. The device of claim 2 where:

the tip end of the composite member has a metal conductor member that is electrically connected with the layer of metallization on the surface of the composite member.

15. The device of claim 14 where:

the metal conductor member comprises a tip conductor secured within and extending beyond the tip end of the composite member.

16. The device of claim 13 where:

The conductor on the exterior of the composite member includes a metal conductor at the tip end of the composite member that makes final electrical contact with the latch member prior to separation.

17. The device of claim 13 where:

the conductor of the whip element and the latch element are formed with smooth engaging surfaces.

18. An air break switch comprising the rapid arc extinguishing device of claim 13 and further including:

a pair of main switch contacts;

a switch opening mechanism for opening the main switch contacts;

conductive attachment of the conductive pathway of the whip element and of the latch element with respective ones of the main switch contacts, the whip element conductor making sliding conductive engagement with the latch element upon operation of the switch opening mechanism, during which flexing of the whip element occurs, until a point at which separation between the whip element and the latch element occurs and the whip element springs away from the latch element.

19. The device of claim 13 where:

the whip element has characteristics to achieve a speed of the second end thereof upon disengagement from the latch element of about 14 to 26 inches in 8 ms.

20. The switch of claim 7 where:

The whip element has characteristics to achieve a speed of the second end thereof upon disengagement from the latch element of about 14 to 26 inches in 8 ms.

* * * * *